United States Patent [19]

Sutton

[11] 3,707,833
[45] Jan. 2, 1973

[54] CORN HARVESTER ROLLS
[75] Inventor: Ralph L. Sutton, Rock Island, Ill.
[73] Assignee: International Harvester Company, Chicago, Ill.
[22] Filed: April 8, 1968
[21] Appl. No.: 719,587

[52] U.S. Cl. .................56/104, 130/5 C, 130/5 G, 130/5 J
[51] Int. Cl. ............................................A01d 45/02
[58] Field of Search..................56/18, 103, 104, 105; 130/5 B–5 J

[56] References Cited

UNITED STATES PATENTS

| 2,604,750 | 7/1952 | Fergason | 56/104 |
| 2,643,657 | 6/1953 | Fergason | 130/5 |
| 2,676,450 | 4/1954 | Schaaf et al. | 56/66 |
| 3,100,491 | 8/1963 | Dillon | 56/104 X |
| 3,139,887 | 7/1964 | Karlsson et al. | 130/5 |
| 3,174,484 | 3/1965 | Anderson | 130/5 |
| 3,262,255 | 7/1966 | Karlsson et al. | 56/107 |
| 3,429,111 | 2/1969 | Looker | 56/103 X |

Primary Examiner—Louis G. Mancene
Assistant Examiner—J. A. Oliff
Attorney—Floyd B. Harman

[57] ABSTRACT

An apparatus for separating ears of sweet corn from the stalk for minimizing damage to the ears. The apparatus has blades with cutting edges that cut through a substantial portion of the stalk and then pull the stalk away from the ear to rupture the uncut portion of the stalk. The ears are held by stripper plates during the rupture of the stalks. The blades are arranged with respect to the stalk such that the pulling force is applied to the stalk over a large flat surface normal to the longitudinal axis of the stalk.

6 Claims, 4 Drawing Figures

PATENTED JAN 2 1973

INVENTOR
RALPH L. SUTTON
BY [signature]
ATT'Y

INVENTOR
RALPH L. SUTTON
BY [signature]
ATT'Y.

CORN HARVESTER ROLLS

BACKGROUND OF THE INVENTION

The present invention relates generally to improvements in corn harvesters and the like and more particularly to new and improved processing rolls for removing ears of sweet corn from the stalk.

The corn harvesting prior art is predominantly concerned with machines for harvesting corn to be fed to cattle. Feed corn has a relatively low moisture content and can be subjected to considerable abuse without resulting damage. The harvesting machinery designed for feed corn could be used for harvesting sweet corn. However, the end product will be damaged and bruised. In harvesting feed corn the harvesting machine is driven down the crop row and the stalk is guided between a pair of oppositely rotating processing rolls. The processing rolls engage the stalk and exerts a downward force on the stalk. A pair of stripper plates override the processing rolls and are spaced from each other a sufficient distance to permit the passage of the stalk but to prevent the passage of an ear of corn. Thus when an ear of corn encounters the stripper plates and the processing rolls exert a downward force on the stalk, the ear is separated from the stalk. Processing rolls of various designs have been used in the past. The various rolls differ in shape and contour of the peripheral surface which determines the frictional characteristic of the particular roll. Reference may be made to the patent to Karlsson et al. U.S. Pat. No. 3,139,887 of July 7, 1964 for a disclosure of a corn harvester using processing rolls and stripper plates of the type described above.

The stripper plates overlying the processing rolls can be adjusted toward and away from each other to vary the width of the material feeding slot therebetween. A further refinement in stripper plates is the rotary stripper plate having a concavo-convex cross section that partially surrounds the processing rolls. The rotary stripper plates enable the processing rolls to grip the stalk or the stem at a point closer to the ear of corn and thus ensure that the ear will be separated from the stalk or stem at a point close to the ear. Reference may be had to the patent to Karlsson et al. U.S. Pat. No. 3,263,255 of July 26, 1966 for a disclosure of rotary stripper plates of the type discussed above. It should be noted that although the above referred to prior art devices were developed for harvesting feed corn, they can also be used to harvest sweet corn. In the above referred to Karlsson et al. patents, the blades of the processing rolls are designed to grip the stalk or stem and then exert sufficient force to snap or tear the ear from the stalk or stem. In so doing an equal and opposite force is applied to the ear by the stripper plate and this force is sufficient to damage and bruise an ear of sweet corn. Thus if processing rolls on stripper plates of the type disclosed in the above Karlsson et al. patents are to be used in the harvest of sweet corn, the amount of force required to separate the ear from the stalk must be reduced. This can be accomplished by sharpening the edges of the blades and thereby cutting through a portion of the stalk or stem. A corn harvester in which the edges of the processing blades are sharpened for this purpose is disclosed in the patent to Schaaf et al. U.S. Pat. No. 2,676,450 of Apr. 4, 1954. The processing blades of the type disclosed in Schaaf et al. have the disadvantage that at the point in the cycle when a downward force must be applied to the stalk, the cutting edge of the blade is at an attitude with respect to the stalk that it tends to slice the stalk axially rather than apply the required force. Another disadvantage of processing blades of this type is their inherent critical requirement that they must be properly synchronized with each other. When they are improperly synchronized the stalks can be completely severed or there can be interference between the blades.

SUMMARY

The general purpose of this invention is to provide processing rolls for a corn harvester which embrace all the advantages of similarly employed processing rolls and possess none of the aforesaid disadvantages. To attain this the present invention contemplates a uniquely shaped processing blade having a cutting edge and a flat pressure surface. The flat pressure surface of the processing blade engages the cut surface of the stalk thus enabling a positive force to be exerted by the processing blade on the stalk. By synchronizing the pair of cooperating processing rolls, such that a plane can be passed through the axes of the rolls and the cutting edges of the blades when the clearance between the edges are a minimum, there will be a steady force applied in a constant direction and ear damage will be minimized. Since the blades are designed such that there is a clearance between the edges when the rolls are in perfect alignment when the rolls drift from perfect alignment the clearance can only be increased and not decreased. Thus misalignment is never a critical problem. The object of the invention is to remove an ear of sweet corn from the stalk while minimizing the damage to and bruising of the ear.

DESCRIPTION OF THE PREFERRED EMBODIMENT

Figure 1:
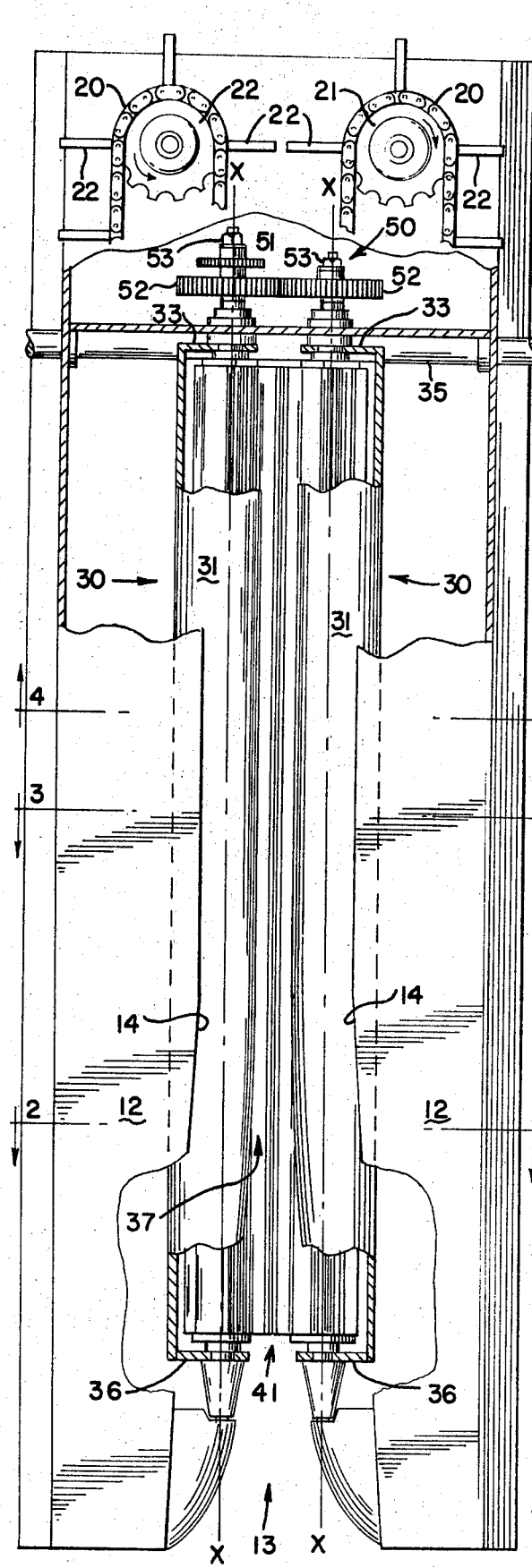
FIG. 1 is a top view of a corn picking apparatus having portions of the casing broken away for clarity.
Figure 3:
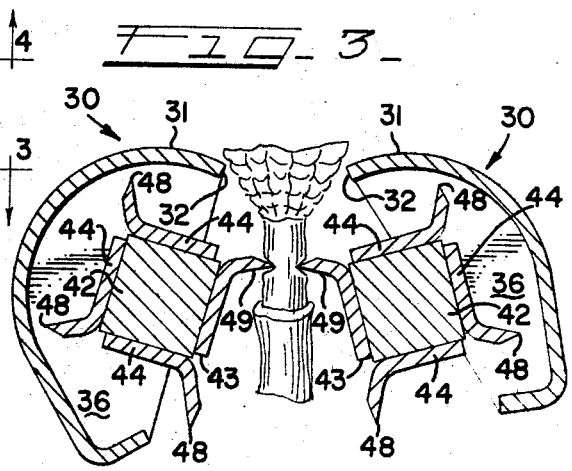
FIG. 3 is a cross-sectional view of the processing rolls and stripper plates taken along lines 3—3 of FIG. 1.
Figure 4:
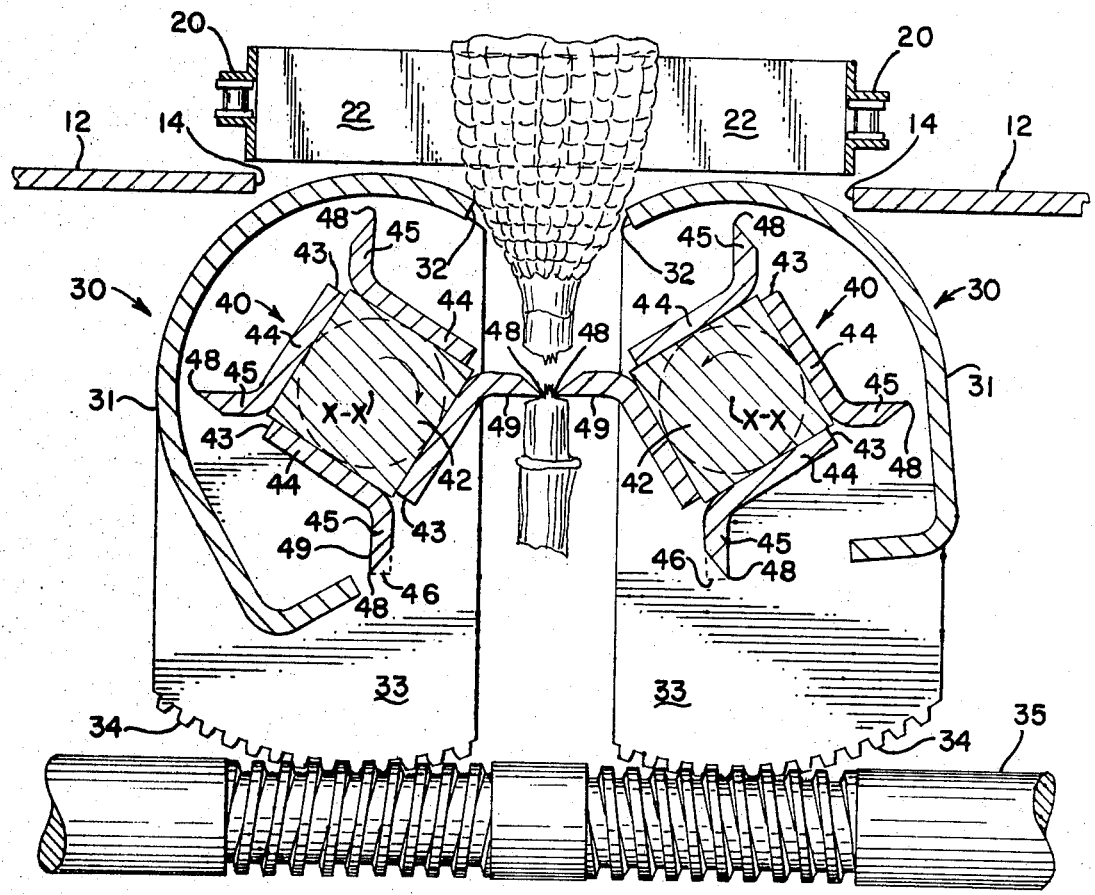
FIG. 4 is a cross-sectional view of the corn picking apparatus taken along lines 4—4 of FIG. 1.

Referring now to the drawings wherein like reference characters designate like or corresponding parts throughout the several views, there is shown in FIG. 1 a corn picking apparatus that could be carried on a tractor mounted corn picker or a combine corn head. The corn picking apparatus 10 includes a casing 11 having an upper surface 12 in which is formed a slot 13 defined by edges 14. A pair of continuous gathering chains 20 having paddles 22 projecting therefrom are carried on the upper surface 12 of the casing 11. The continuous gathering chains 20 engage drive sprockets 21 and 22 which impart rotary movement to the continuous chains. As seen in FIG. 1, drive sprocket 21 rotates in a clockwise direction and drive sprocket 22 rotates in a counterclockwise direction. This opposite rotation of the sprockets 21 and 22 causes the paddles 22 to move up the slot 13 defined by edges 14 towards the sprockets 21 and 22. As seen in FIG. 4 the upward movement of paddles 22 function to transport an ear of corn located between edges 14 in a direction towards the drive sprockets 21 and 22. A pair of elongated stripper plates 30 are mounted in the corn picking apparatus 10 below the surface 12. Each of the stripper plates 30 has a material engaging sheet having a concavo-convex transverse cross-section shaped such that they will surround a portion of the adjacent processing roll 40. The stripper plates 30 are mounted for rotation about the axes X—X of the adjacent processing roll 40. Each of the stripper plates 30 have a longitudinal material-engaging edge designated 32. Each of the stripper plates 30 has an upper end section plate 33, see FIG. 4, and a lower end section plate 36, see FIGS. 2 and 3. The upper end section plates 33 have arcuate peripheral edges 34 having gear teeth formed thereon. A pinion worm gear 35 having oppositely pitched threads is rotatably mounted in the casing 11 such that it is in engagement with the gear teeth along the peripheral edges 34. Upon rotation of the pinion worm gear 35 the stripper plates 30 are rotated about the axes X—X in opposite directions. The material engaging edges 32 define a material feeding slot designated 37, the width of which is adjusted when the stripper plates 30 are rotated about axes X—X. The dimensions of the material feeding slot are of course dictated by the size of the ear corn to be harvested and it should be small enough so that the ear of corn cannot be pulled through the slot 37 and yet large enough so that the processing rolls 40 can grip the stalk at a point a minimum distance from the ear.

Figure 2:
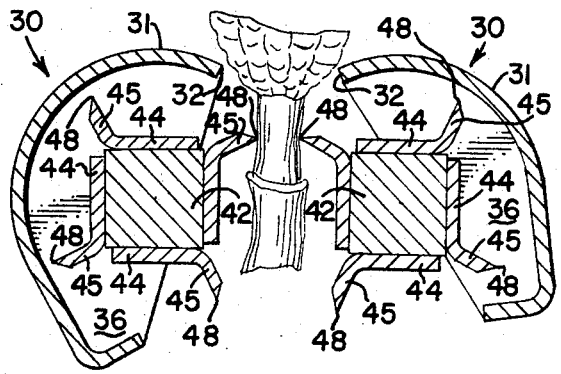
FIG. 2 is a cross-sectional view of the processing rolls and stripper plates taken along lines 2—2 of FIG. 1.

The pair of processing rolls 40 are rotatably mounted on the casing 11 about substantially parallel axes X—X. The axes X—X are spaced from each other sufficiently so that the processing rolls 40 will define a stalk feeding slot 41 therebetween. Each processing roll 40 includes a core 42 which as illustrated in FIGS. 2, 3 and 4 has a square cross-section and is adopted to mount four stalk-engaging blades 48. The blades 43 about the core 42 in tangential relation with an imaginary circle inscribed within the core about its axis. (See FIG. 4). It should be noted, however, that the cross-sectional shape of the core 42 need not be square, but rather can be shaped to mount more or fewer blades. The stalk-engaging blades 43 of the illustrated embodiment are constructed of elongated plates that have been bent along a line extending their entire length. The bend in the plate divides the blade into a fastening area 44 and a working area 45. The working area 45 terminates along a longitudinal edge 46 which has been beveled to form a cutting edge 48.

As can be seen in FIG. 1 there are means 50 at the upper end of the processing rolls for effecting rotation thereof. Each of the processing rolls 40 has a gear 52 slidably connected by splines (not shown) or the like. The gears 52 intermesh with each other and are of equal size and pitch such that when one processing roll is rotated an equal but opposite rotary motion is transmitted to the adjacent roll. Sprocket 51 is connected to one of the processing rolls by splines or the like, not shown. Lock nuts 53 are provided to retain the gear 52 and the sprocket 51 in place on the processing rolls. Rotary motion is thus transmitted by a chain or the like to sprocket 51 in a direction such that the cutting edges 48 of adjacent processing rolls 40 move downwardly toward the adjacent roll approaching the position shown in FIG. 4 wherein a plane can be passed through the parallel axes X—X and the cutting edges 48 when the clearance between the edges is at a minimum.

Referring now to FIG. 4 wherein the longitudinal edge 46 of several of the stalk engaging blades 43 have been shown in broken lines to illustrate that the cutting edges 48 are formed along the leading corner of the longitudinal edges. This is important to applicant's invention because by so bevelling the cutting edges, flat pressure surfaces 49 are in engagement with the cut portion of the stalk at the point in the cycle when the stalk is torn from the ear. This relationship is best illustrated in FIG. 4. It should be noted that the critical relationship is that the flat pressure surfaces 49 approach, as rolls 40 rotate, the plane extending through the axes X—X.

Reference is hereby made to FIGS. 2, 3 and 4 which illustrate a sequence in stripping an ear from the stalk. The sequence begins with FIG. 2 where the stalk or stem has been fed downwardly by the processing rolls 40 to the point where the ear of corn contacts the material-engaging edges 32 of the stripper plates 30. At this point in the sequence the cutting edges 48 engage the stalk or stem at a point a minimum distance from the ear of corn. The direction of rotation of the processing rolls 40 is indicated by the arrows appearing in FIG. 2. FIG. 3 illustrates a second step in the sequence where the processing rolls 40 have been rotated at 16° from the position in FIG. 2. In FIG. 3 it can be seen that the cutting edges 48 have begun cutting through the stalk and have also pulled it downwardly from its position in FIG. 2. At this point the stalk or stem and ear between the cutting edges 48 and the material-engaging edges 32 of the stripper plates 30 are in tension. FIG. 4 illustrates a third step in the sequence in which the processing rolls 40 have rotated approximately another 16°. In FIG. 4 the cutting edges 48 have reached the point where there is a minimum clearance between adjacent edges and a substantial portion of the stalk or stem has been cut. It should be noted that the cutting edges do not cut entirely through the stalk and that there is a remaining segment of stalks that must be torn or ruptured in order to separate the ear. As shown in FIG. 4 the ear has been severed from the stalk and is now free to be carried by the paddles 22 of the gathering chains 20 upwardly along the stripper plates 30 where they will be collected.

It should be noted that the processing rolls 40 are sequentially arranged with respect to each other such that the cutting edges 48 are in phase with each other so that cooperating cutting edges will grip the stalk on opposite sides in a plane normal to the longitudinal axes of the stalk. By adjusting the processing rolls 40 to be in phase renders the cutting edges 48 more effective to actually cut into the stalk rather than to frictionally engage the surface. The in-phase arrangement of the processing rolls have a further advantage in that a steady even pull is exerted downwardly on the ear as seen in FIGS. 2 through 4 inclusive which results in a minimum damage to the ear at the point of engagement with the material-engaging edges 32. If the processing rolls 40 are not in phase the ear corn is rocked first in one direction then in the other resulting in considerable abrasion between the material-engaging edges 32 and the ear of corn.

What is claimed is:

1. For use in a corn picking apparatus, a pair of rotating processing rolls, means mounting said pair of rolls about substantially parallel axes, each of said rolls including a core, means for simultaneously rotating said pair of rolls in timed relationship to snap ears of corn from corn stalks, a plurality of elongated stalk-engaging blades affixed to each of said cores, each of said blades comprising a fastening area for abutting said core in tangential relation with a circle inscribed within the core about its axis and a working area spaced from said fastening area, each of said working areas having a flat pressure surface arranged such that as the rolls rotate said flat pressure surface approaches and lies within the plane extending through said parallel axes, the working area of each of said blades terminating in longitudinal edges, said longitudinal edges being beveled to form cutting edges.

2. The invention as set forth in claim 1 wherein each of said blades are bent longitudinally between said fastening and said working area such that said working area extends radially with respect to the roll axis.

3. The invention as set forth in claim 2 wherein said rolls rotate in opposite directions such that said cutting edges move downwards towards the adjacent roll and wherein said cutting edges are formed along the leading corner of said longitudinal edges.

4. In a corn-picking apparatus, the combination of a pair of corn-feeding rolls mounted on substantially parallel axes to define a stalk-feeding slot therebetween;
   each of said rolls including a core, a plurality of elongated stalk-engaging blades affixed to each of said cores, each of said blades comprising a fastening area for abutting said core in tangential relation with a circle inscribed within the core about its axis and a working area spaced from said fastening area, each of said working areas having a flat pressure surface arranged such that as the rolls rotate said flat pressure surface approaches and lies within the plane extending through said parallel axes, the working area of each of said blades terminating in longitudinal edges, said longitudinal edges being beveled to form cutting edges,
   means for effecting simultaneous rotation of said rolls in timed relationship to snap ears of corn from corn stalks;
   a pair of stripper plates overlying said pair of corn-feeding rolls, said stripper plates being spaced from each other to define a material feeding slot aligned with said stalk-feeding slot.

5. The invention as set forth in claim 4 wherein each of said blades are bent longitudinally between said fastening and said working area such that said working area extends radially with respect to the roll axis.

6. The invention as set forth in claim 5 wherein said rolls rotate in opposite directions such that said cutting edges move downwardly toward the adjacent roll and wherein said cutting edges are formed along the leading corner of said longitudinal edges.

* * * * *